(12) United States Patent
Coppage

(10) Patent No.: US 10,148,822 B2
(45) Date of Patent: *Dec. 4, 2018

(54) METHOD AND APPARATUS FOR SELECTING A COMMUNICATION NETWORK

(71) Applicant: CenturyLink Intellectual Property LLC, Denver, CO (US)

(72) Inventor: Carl Milton Coppage, Bolivar, MO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 641 days.

This patent is subject to a terminal disclaimer.

(21) Appl. No.: 14/631,591

(22) Filed: Feb. 25, 2015

(65) Prior Publication Data

US 2015/0181044 A1 Jun. 25, 2015

Related U.S. Application Data

(63) Continuation of application No. 13/689,881, filed on Nov. 30, 2012, now Pat. No. 9,001,820, which is a
(Continued)

(51) Int. Cl.
*H04M 7/00* (2006.01)
*H04Q 3/00* (2006.01)
(Continued)

(52) U.S. Cl.
CPC ........ *H04M 7/0066* (2013.01); *H04L 67/142* (2013.01); *H04M 1/2535* (2013.01); *H04M 7/0057* (2013.01); *H04Q 3/0029* (2013.01)

(58) Field of Classification Search
CPC ............. H04M 7/0066; H04M 1/2535; H04M 7/0057; H04L 67/142; H04Q 3/0029
See application file for complete search history.

(56) References Cited

U.S. PATENT DOCUMENTS 6,532,490 B1 3/2003 Lewis et al.
6,597,686 B1 7/2003 Smyk
(Continued)

FOREIGN PATENT DOCUMENTS

CN 101330733 A 12/2008

OTHER PUBLICATIONS

U.S. Appl. No. 11/904,698; Notice of Publication dated Apr. 2, 2009; 1 page.
(Continued)

*Primary Examiner* — Dady Chery
(74) *Attorney, Agent, or Firm* — Adsero IP

(57) ABSTRACT

A method, apparatus, and computer usable program product for selecting a network for telecommunication are provided. A type of network supporting a called identifier is identified. Several types of networks are accessible to a calling communication device. A database is queried with a query including the called identifier to identify the types of networks that are accessible to a called communication device. A network corresponding to the called communication device is selected at the calling communication device. A communication session is established between the calling and called communication devices using the selected network.

20 Claims, 4 Drawing Sheets

Related U.S. Application Data continuation of application No. 11/904,698, filed on Sep. 28, 2007, now Pat. No. 8,340,079.

(51) Int. Cl.
*H04L 29/08* (2006.01)
*H04M 1/253* (2006.01)

(56) References Cited

U.S. PATENT DOCUMENTS

| | | |
|---|---|---|
| 7,092,380 B1 | 8/2006 | Chen et al. |
| 7,171,233 B2 | 1/2007 | Sanchez |
| 7,197,029 B1 * | 3/2007 | Osterhout ............ H04M 1/2535 370/338 |
| 7,263,360 B2 | 8/2007 | Naeini et al. |
| 7,599,323 B2 | 10/2009 | Chandranmenon et al. |
| 7,630,965 B1 | 12/2009 | Erickson et al. |
| 8,340,079 B2 | 12/2012 | Coppage |
| 8,559,415 B2 | 10/2013 | Coppage et al. |
| 9,001,820 B2 | 4/2015 | Coppage |
| 2002/0080751 A1 | 6/2002 | Hartmaier |
| 2005/0105706 A1 | 5/2005 | Kokkinen |
| 2005/0131870 A1 | 6/2005 | Krishnaswamy et al. |
| 2005/0169250 A1 * | 8/2005 | Kwak ............... H04L 29/06027 370/352 |
| 2006/0085824 A1 | 4/2006 | Bruck et al. |
| 2006/0161892 A1 | 7/2006 | Anand et al. |
| 2006/0205434 A1 | 9/2006 | Tom et al. |
| 2006/0285535 A1 * | 12/2006 | Metcalf ............. H04L 29/06027 370/352 |
| 2007/0060097 A1 * | 3/2007 | Edge ................ H04L 29/06027 455/404.1 |
| 2007/0076691 A1 | 4/2007 | Varney et al. |
| 2007/0121598 A1 * | 5/2007 | McGary ............ H04L 29/06027 370/356 |
| 2007/0183399 A1 * | 8/2007 | Bennett ............... H04M 7/0057 370/352 |
| 2007/0183400 A1 * | 8/2007 | Bennett ............... H04M 1/2535 370/352 |
| 2007/0242619 A1 | 10/2007 | Murakami et al. |
| 2007/0254646 A1 | 11/2007 | Sokondar |
| 2008/0020777 A1 | 1/2008 | Zhang et al. |
| 2008/0056272 A1 | 3/2008 | Batta |
| 2008/0101224 A1 * | 5/2008 | Khasnabish ........ H04L 43/0817 370/230 |
| 2008/0112551 A1 | 5/2008 | Forbes et al. |
| 2009/0022149 A1 * | 1/2009 | Rosenberg .......... H04M 7/0057 370/389 |

OTHER PUBLICATIONS

U.S. Appl. No. 11/904,698; NonFinal Office Action dated Mar. 14, 2011; 6 pages.
U.S. Appl. No. 11/904,698; NonFinal Office Action dated Jun. 23, 2011; 7 pages.
U.S. Appl. No. 11/904,698; Final Office Action dated Oct. 18, 2011; 6 pages.
U.S. Appl. No. 11/904,698; Notice of Allowance dated Aug. 24, 2012; 7 pages.
U.S. Appl. No. 11/904,897; Notice of Publication dated Apr. 2, 2009; 1 page.
U.S. Appl. No. 11/904,897; NonFinal Office Action dated Jul. 6, 2011; 22 pages.
U.S. Appl. No. 11/904,897; Final Office Action dated Dec. 1, 2011; 23 pages.
U.S. Appl. No. 11/904,897; NonFinal Office Action dated Feb. 10, 2012; 26 pages.
U.S. Appl. No. 11/904,897; Final Office Action dated May 24, 2012; 30 pages.
U.S. Appl. No. 11/904,897; NonFinal Office Action dated Aug. 16, 2012; 28 pages.
U.S. Appl. No. 11/904,897; Final Office Action dated Nov. 7, 2012; 29 pages.
U.S. Appl. No. 11/904,897; NonFinal Office Action dated Mar. 14, 2013; 17 pages.
U.S. Appl. No. 11/904,897; Notice of Allowance & Interview Summary dated Jun. 10, 2013; 18 pages.
U.S. Appl. No. 13/689,881; Notice of Publication dated Apr. 15, 2013; 1 page.
U.S. Appl. No. 13/689,881; NonFinal Office Action dated Mar. 28, 2014; 4 pages.
U.S. Appl. No. 13/689,881; Notice of Allowance dated Aug. 4, 2014; 7 pages.
U.S. Appl. No. 13/689,881; Notice of Allowance dated Nov. 26, 2014; 12 pages.

* cited by examiner

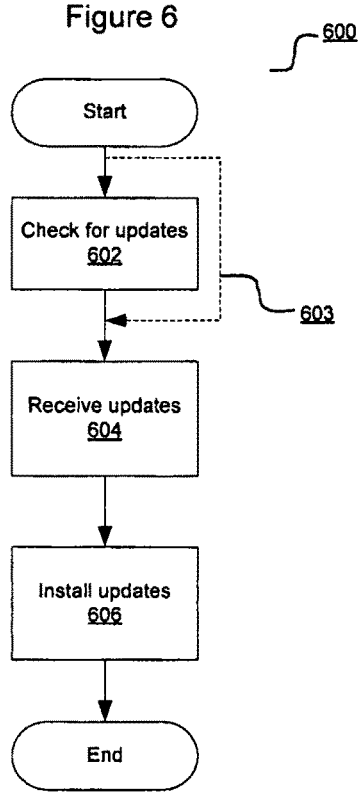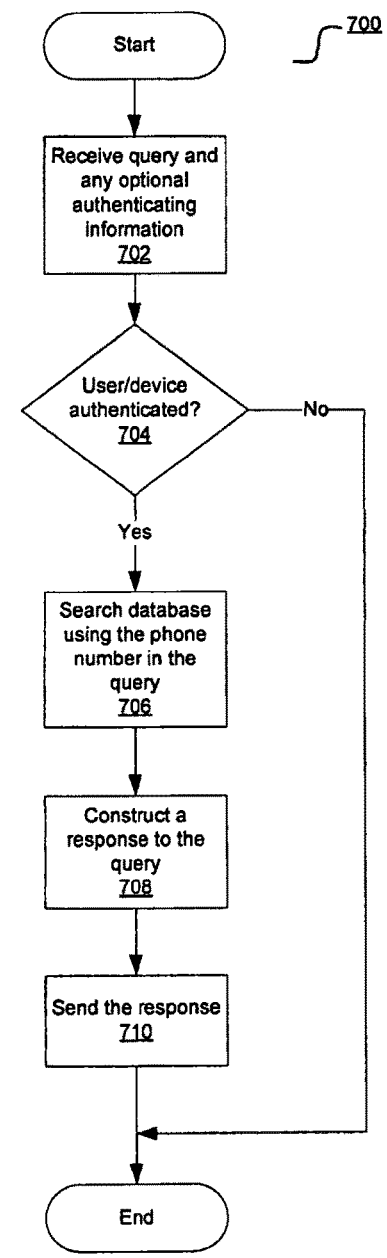

METHOD AND APPARATUS FOR SELECTING A COMMUNICATION NETWORK

CROSS REFERENCE TO RELATED APPLICATIONS

This Application is a Continuation of U.S. patent application Ser. No. 13/689,881, filed Nov. 30, 2012, entitled, "Method and Apparatus for Selecting a Communication Network", which is a Continuation of U.S. patent application Ser. No. 11/904,698, filed Sep. 28, 2007, entitled METHOD AND APPARATUS FOR SELECTING A NETWORK FOR TELECOMMUNICATION, both of which is hereby incorporated by reference in its entirety.

BACKGROUND

1. Field of the Invention

The principles of the present invention relate generally to an improved telecommunication system, and in particular, to using networks for telecommunication. Still more particularly, the principles of the present invention relate to a method, apparatus, and computer usable program product for selecting a network for telecommunication.

2. Description of the Related Art

Telecommunication involves two or more communication devices communicating with each other using a communication network. For example, two telephones may be able to communicate with each other using a telecommunication network called public switched telephone network (PSTN). PSTN is primarily a voice telecommunication network for enabling telephone-based telecommunication between two or more parties.

A "caller telephone" or a "calling telephone" is a telephone from which a voice call is placed. A "called telephone" is a telephone on which a voice call is received. A "caller party" or a "calling party" is an individual or a party who places a voice call. A "called party" is an individual or party who receives a voice call. A "caller number" or a "calling number" is a telephone number from which a voice call is placed. A "called number" is a telephone number on which a voice call is received.

Similarly, a "caller communication device" or a "calling communication device" is a communication device from which a telecommunication call is placed; and a "called communication device" is a communication device on which a telecommunication call in received. The term "communication devices" refers to the collection of all devices used for telecommunication. For example, a communication device can be the familiar telephone, a computer with a telecommunication enabling software application, a telephone like device that works over data networks instead of plain old telephone system (POTS) line, a wireless or cellular phone, or any other device used for telecommunication. A communication device is any one of these communication devices.

VOIP is a telecommunication method for transmitting voice communications over a data network, such as the Internet. Common VOIP implementations are in telephony where telephone conversations are partly carried over the Internet from a caller telephone to a called telephone. A VOIP call is a voice call connected using VOIP technology. VOIP data is the data that represents the voice signals in a voice call that is connected through VOIP systems.

Data networks are broadly categorized into two categories—local area network (LAN) and wide area network (WAN). A LAN is a data network that connects a few data processing systems, generally within a home or an office. A WAN is a data network that connects several LANs and data processing systems together, generally across cities, countries, and continents. The Internet is an example of a WAN, whereas a home networking is an example of a LAN.

Various communication devices are capable of communicating with each other using a variety of networks. Some communication devices are able to communicate over PSTN, other communication devices communicate over wired or wireless LANs and WANs, such as a VOIP enabled telephone. Presently, a communication device capable of communicating on one type of network may be able to communicate with another communication device capable of communicating on another type of network, by using intermediate data processing systems for connecting the communication devices operating on dissimilar networks. These intermediate data processing systems are commonly known as gateways, and they bridge different types of networks in the path from a caller communication device to a called communication device.

SUMMARY

To reduce the cost and complexity of network based gateways and data processing presently needed for connecting calls originating and terminating on different types of networks, the illustrative embodiments provide for selecting a network for telecommunication. In one embodiment, a type of network supporting a called identifier is identified. Several types of networks are accessible to a calling communication device for making a call to the called identifier. The network corresponding to the identified network is selected at the calling communication device. A communication session is established between the calling communication device and a called communication device associated with the called identifier is completed using the selected network.

In another embodiment, a database is queried with a query including the called identifier. The response to the query is used for identifying the identified network from the response. In another embodiment, the query may be sent to a local database, a remote database, or both. The local database may include information about called identifiers that are called from the calling communication device frequently, and may include called identifiers that are provided by a user. The remote database may include information about called identifiers known to a provider of the remote database, authenticating information about several users capable of sending the query, and authenticating information about several communication devices capable of sending the query.

In another embodiment, updates may be received and installed. In another embodiment, the identified network may be overridden by selecting a network of a type that is different from the type of network supporting the called identifier.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 6 depicts a flowchart of a process of updating the network selection application in accordance with an illustrative embodiment; and FIG. 7 depicts a flowchart of a process of responding to a request from a network selection application in accordance with an illustrative embodiment.

DETAILED DESCRIPTION OF THE DRAWINGS

Presently, communication devices that can connect to more than one networks are available. For example, a telephone that can connect to PSTN as well as VOIP networks are currently available. However, a user using such a communication device determines which network to use when making a call. For example, a user may set the telephone to use VOIP network for voice communications and PSTN for fax calls.

Furthermore, when a call is made from a communication device on one network to a called communication device on another network, present systems employ a series of gateways and other data processing systems to connect calls on dissimilar networks. For example, a VOIP call originating from a VOIP enabled telephone and terminating at a PSTN called telephone goes through a series of gateways that bridge the VOIP network and PSTN.

Illustrative embodiments recognize that these gateways, and the data processing performed by these gateways are expensive, time consuming, and complex systems. The illustrative embodiments further recognize that calls originating and terminating on the same type of network are much more efficient and easier to manage as compared to calls originating and terminating on different types of networks.

Therefore, the illustrative embodiments recognize that communication devices that are capable of connecting to more than one networks can be modified as described below to select a network such that the caller communication device and the called communication device may communicate on similar networks. For example, a caller telephone capable of connecting to a VOIP network and PSTN may select a network from among those networks, which matches the network that a called telephone may be using. As another example, a cellular phone capable of connecting to cellular network as well as VOIP network may select one of those networks based on the called number. Many other combinations and configurations will become apparent from the description of the illustrative embodiments provided below.

Figure 1:
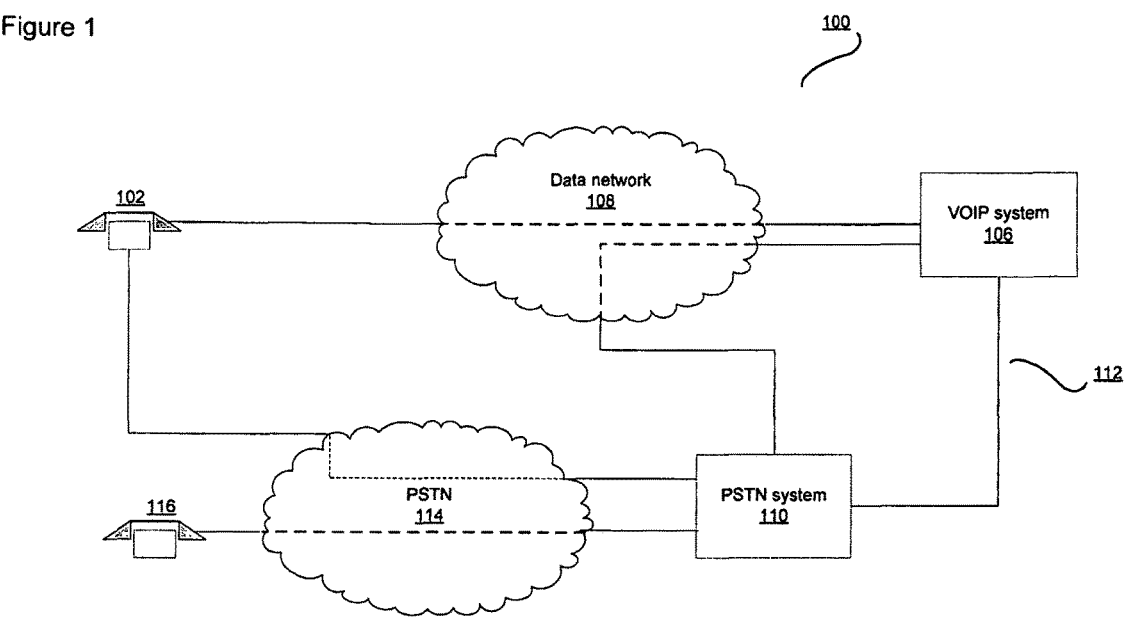
FIG. 1 depicts a block diagram of a telecommunication system in which illustrative embodiments may be implemented.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments may be implemented. Many modifications to the depicted environments may be made.

FIG. 1 depicts a block diagram of a telecommunication system in which illustrative embodiments may be implemented. A telecommunication system 100 includes a phone 102 that connects to more than one networks. A phone is a communication device. In one embodiment, phone 102 may be a familiar telephone equipment commonly used in homes. In another embodiment, phone 102 may be a software application, such as a softphone application, running on a data processing system, such as a voice-enabled application running on a computer. In other embodiments phone 102 may be any other device, system, subsystem, application, or a combination thereof suitable for voice communications.

A VOIP adapter (not shown) is an electronic device that can connect to phone 102, and convert the voice signals to and from phone 102 into data that can be processed for connecting a VOIP call. In one embodiment, phone 102 and VOIP adapter may be combined into one integrated device, forming phone 102.

A VOIP system 106 is representative of the entire VOIP system that a VOIP provider uses for providing VOIP services. VOIP system 106 may include a VOIP gateway and many other equipments, all of which together enable a VOIP provider to provide VOIP services. Phone 102 communicates with VOIP system 106 over a data network 108. Data network 108 is a VOIP network as described above. An example of data network 108 is the Internet.

For completing VOIP calls, such as a VOIP call originating from phone 102, VOIP system 106 communicates with providers of regular telephone services, such as PSTN providers, as well as other VOIP providers. FIG. 1 depicts VOIP system 106 in communication with a PSTN provider's PSTN system 110. VOIP system 106 may communicate with PSTN system 110 using a dedicated communication link 112, or using Public data network 108. PSTN provider's system 110 uses a PSTN network 114 for completing the call that originated as a VOIP call from phone 102 to a phone 116. Phone 116 is also a communication device as described above with respect to phone 102. A dedicated communication link, such as dedicated communication link 112, is a telecommunication link configured for enabling communication only between predetermined parties.

Likewise, a call originating from phone 116 can be completed at phone 102 by traversing VOIP system 100 in order from phone 116 to phone 102. FIG. 1 depicts only schematic components involved in telecommunication system 100. Several other components, devices, systems, and interconnects may be present in a typical VOIP system but are not shown in FIG. 1 for clarity of the description.

Figure 2:
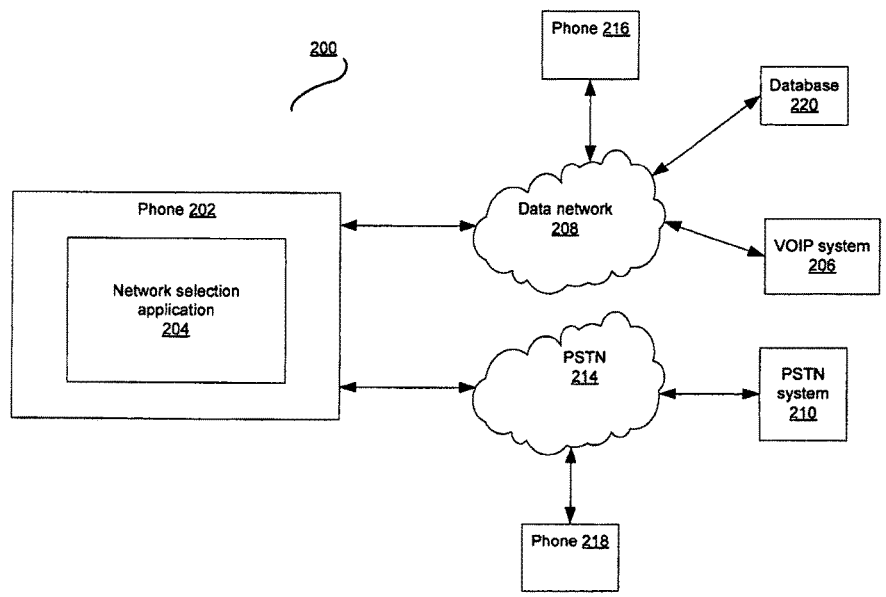
FIG. 2 depicts a block diagram of a system for selecting a network for communication in accordance with an illustrative embodiment.

With reference to FIG. 2, this figure depicts a block diagram of a system for selecting a network for communication in accordance with an illustrative embodiment. System 200 may be implemented using telecommunication system 100 in FIG. 1. Phone 202 may be implemented using phone 102 in FIG. 1.

Phone 202 includes network selection application 204. Phone 202 may communicate with VOIP system 206 over data network 208 in the manner described above with respect to FIG. 1. Phone 202 may also communicate with PSTN system 210 over PSTN 214, as described above with respect to FIG. 1. Other phones may also communicate with data network 208, PSTN 214, or both. For example, VOIP enabled phone 216 is shown as being in communication with data network 208, whereas PSTN phone 218 is shown to be in communication with PSTN 214. Phone 202 may call phones 216 and 218, and other similarly situated phones.

Network selection application 204 interacts with database 220 over data network 208. This interaction helps in the selection of either data network 208 or PSTN 214 for making a call from phone 202. The manner of network selection application 204's interaction with database 220, and the manner of selection of network for communication between phone 202 and exemplary phones 216 and 218, is described in detail in the description of subsequent figures below.

Figure 3:
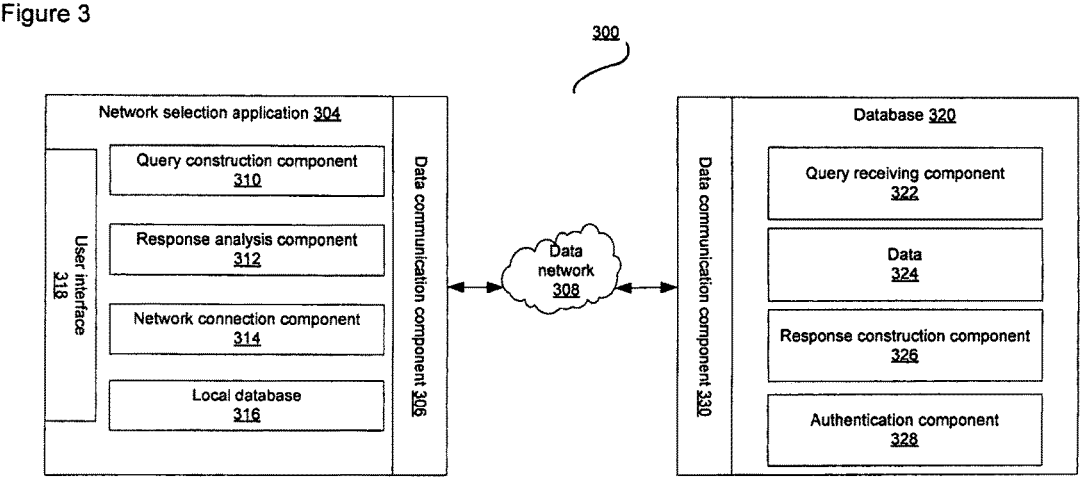
FIG. 3 depicts a block diagram of a network selection system in accordance with an illustrative embodiment.

With reference to FIG. 3, this figure depicts a block diagram of a network selection system in accordance with an illustrative embodiment. Network selection system 300 includes network selection application 304, which may be implemented using network selection application 204 in FIG. 2.

Network selection application 304 uses data communication component 306 for communicating with data network 308. Data network 308 may be implemented using data network 208 in FIG. 2. Network selection application 304 includes query construction component 310, response analysis component 312, network selection component 314, local database 316, and user interface 318.

Network selection system 300 includes database 320, which may be implemented using database 220 in FIG. 2. Database 320 is a remote database. A remote databases is a database that is accessed over a data network. Database 320 includes query receiving component 322, data 324, response construction component 326, and optional authentication component 328. Database 320 uses data communication component 330 for communicating with data network 308.

When a user dials a called number on a caller phone, such as phone 202 in FIG. 2, network selection application 304 receives the called number. Using the called number, query construction component 310 constructs a query for database 320 to determine a type of network on which the called number operates. Note that the user may be a human user of the caller phone, or an application, such as a software application, making a call.

In one embodiment before constructing a query for database 320, query construction component 310 may query local database 316. Local database 316 may include information similar to the information provided by database 320, but for certain called numbers that are called frequently or are provided by the user of the caller phone. Local database 316 may also learn, and store the learnt information for future use, from the results of previous queries sent to database 320.

By querying local database 316 first querying database 320 may be avoided if information about the called number is present in local database 316. Avoiding querying database 320 may reduce the total time needed for connecting the call in accordance with the illustrative embodiment, as queries to local databases are generally faster than queries to remote databases.

In another embodiment, both databases—local database 316 and remote database 320—may be queried. As an example, an implementation of the illustrative embodiment may choose to query both databases for verifying the accuracy of the information in either database, or for updating the information in either database.

Another embodiment may query the remote database, database 320, before querying the local database 316. As an example, this order of querying may be useful if the local database is non-responsive for any reason. Continuing with the description of components of network selection application 304, response analysis component 312 receives and analyzes the response to the query sent by query construction component 310. The response may be a response to a query sent to local database 316 or a response to a query sent to database 320. Response from database 320 may be received using data communication component 306.

By analyzing the response, response analysis component 312 identifies a network that may be used for connecting the call to the called number. Network connection component 314 may use the identified network and completes the call to the called number on the identified network.

In some circumstances, the identified network may not be acceptable to the user originating the call. In such circumstances, the user may wish to override the selection of the identified network and select a different network for completing the call. User interface 318 provides the user the capability for specifying the overriding instructions, for example, for specifying which network to use instead of the identified network.

User interface 318 may take any form suitable for the communication device being used for making the call. For example, when the communication device is a telephone, user interface 318 may be the keypad of the telephone. As another example, when the communication device is a softphone, user interface 318 may be a graphical user interface displayed on a computer monitor. User interface 318 may also be simply a function, an application programming interface (API), or an equivalent thereof, which can be called by an application placing the call, or network selection application 304, such as in the case when a call fails on the identified network and an alternate network has to be selected. Many other ways of implementing user interface 318 will become apparent from this disclosure. The process of overriding an identified network is described in greater detail with respect to FIG. 5.

When a query is sent to database 320, network selection application 304 uses data communication component 306 for communicating with database 320 over data network 308. Similarly, database 320 uses data communication component 330 for communicating with data network 308. Database 320 receives a query sent to database 320, through data communication component 330, using query receiving component 322. Query receiving component 322 may perform other functions in addition to receiving the query. For example, query receiving component 322 may perform pre-processing of the query, such as optimizing the query, reforming the query, scheduling the query for execution, and logging the query. Many other query pre-processing functions will be conceivable from the description of the illustrative embodiment.

Furthermore, query receiving component 322 may authenticate the user and/or the communication device that sent the query. For authenticating, query receiving component 322 may use authentication component 328.

In one embodiment, authentication may be an optional function and authentication component 328 may be an optional component. In another embodiment, authentication may be a task external to database 320, and authentication component 328 may be external to database 320. In yet another embodiment, authentication may be an implicit function of query receiving component 322, and authentication component 328 may be merged with query receiving component 322. Many other configurations will be conceivable from this description of the illustrative embodiment.

Once a query is received and optionally pre-processed, and optional authentication performed, the query is submitted for searching data 324. Data 324 includes at least a listing of several phone numbers and their corresponding networks. For example, data 324 may include a telephone number 212-555-1212 and an indication that the telephone number operates on PSTN, and a telephone number 212-555-1313 and an indication that the telephone number operates on VOIP network.

Data 324 may include many other pieces of information, or attributes, about the telephone numbers or users stored therein. For example, data 324 may include not only telephone numbers, but wireless numbers, user identifier (user ID), short message service (SMS) numbers, instant messaging (IM) identifiers, email addresses, Internet protocol (IP) addresses, street addresses, global positioning system (GPS) locations, device capabilities, and other similar attributes associated with a caller/called party, and a caller/called communication device. Furthermore, data 324, and database 320 as a whole, may be distributed across several data processing systems, organized and interconnected with each other in some logical fashion.

In one embodiment, the telephone number itself may provide an indication of the network on which a communication device associated with that telephone number is supported. For example, a telephone number having a particular area code may be indicative of a particular carrier's network, and the network's type by implication, such as PSTN. In another embodiment, another type of identifier, such as a user ID, may indicate the type of network supporting the called communication device. For example, a call to a user ID instead of a conventional telephone number may indicate that the called communication device is supported on a data network, such as a VOIP network. Similarly, other identifiers for a called party may indicate the type of network supporting a called communication device, and are contemplated within the scope of the illustrative embodiments. Any identifier, including the examples provided above, that identifies a called party, is called a called identifier. Similarly, any identifier, including the examples provided above, that identifies a calling party, is called a calling identifier.

Once the query is executed against data 324, response construction component 326 prepares the result of the query in a form that may be acceptable to network selection application 304. The prepared response is then sent from database 320 to network selection application 304 over data network 308, using data communication components 306 and 330.

The components depicted in FIG. 3 are depicted only as exemplary for the clarity of the description, and are not limiting on the illustrative embodiments. A particular implementation may organize the components differently than shown, may combine, subdivide, or augment the depicted components without departing from the scope or spirit of the illustrative embodiments.

Figure 4:
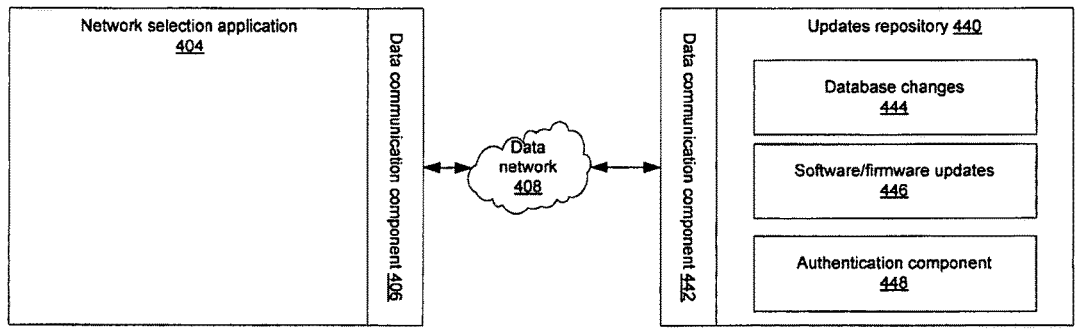
FIG. 4 depicts a system for updating a network selection application in accordance with an illustrative embodiment.

With reference to FIG. 4, this figure depicts a system for updating a network selection application in accordance with an illustrative embodiment. Network selection application 404 may be implemented using network selection application 304 in FIG. 3.

Network selection application 404 uses data communication component 406 to communicate over data network 408 in a manner similar to the manner described with respect to FIG. 3. Using this manner of data communication, network selection application 404 receives information for updating network selection application 404 and its various components described above.

Updates repository 440 is a repository of updated information that is usable for updating a network selection application, such as network selection application 404, and its various components. Updates repository 440 is capable of communicating the updates over data network 408 using data communication component 442.

Updates repository may include updates for hardware, software, firmware, and data components of a network selection application. In the exemplary depiction of FIG. 4, updates repository 440 is shown to include updates pertaining to database changes 444, and software/firmware updates 446. Note that updates repository 440 may be a repository separate from, or same as, database, such as database 320 in FIG. 3.

As one example of database changes 444, database changes 444 may include updates for data that may have been sent by database 320 in FIG. 3 to local database 316 in FIG. 3 that may have changed or become obsolete. As another example, database changes 444 may include information about a changed location, such as IP address or URL, of database 320 in FIG. 3. As another example, database changes 444 may include information about a changed schema of data 324 in database 320 in FIG. 3, to facilitate correct construction of future queries in query construction component 320 in FIG. 3. These examples are not limiting, and many other database changes are conceivable from the description of the illustrative embodiments.

Software/firmware updates 446 may include information that may update the functionality of the network selection application or its components. For example, software/firmware update 446 may include information that corrects a malfunction, or bug, in the code of the network selection application. As another example, software/firmware update 446 may include information that enhances the speed performance of a component, such as data communication component 306 in FIG. 3. As another example, software/firmware update 446 may include information that adds a new capability, such as adding a new network to select from in the network selection component. These examples are not limiting, and many other database changes are conceivable from the description of the illustrative embodiments.

Updates repository 440 may also optionally include authentication component 448 for authenticating a user or device attempting to use updates repository 440. Authentication component 448 may be particularly helpful in certain circumstances. For example, if the updates repository is hosted by a device manufacturer, the manufacturer may want to restrict access to the updates repository to only the devices manufactured by that manufacturer. As another example, authentication component may be used to restrict access to the updates repository to only the subscribers of a network service provider, if the network service provider hosts the updates repository.

In one embodiment, authentication component 448 may be absent. In another embodiment, authentication component 448 may be combined with other components. In another embodiment, authentication component 448 may be external to updates repository 440.

Figure 5:
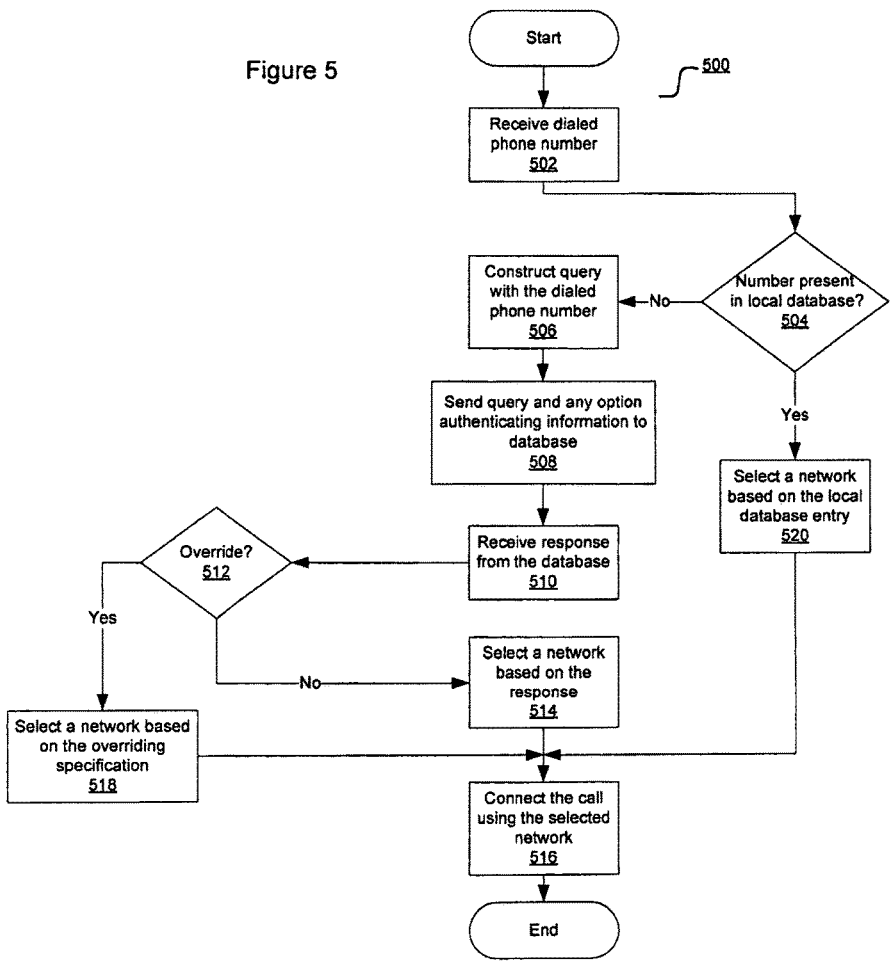
FIG. 5 depicts a flowchart of a process for selecting a network for telecommunication in accordance with an illustrative embodiment.

With reference to FIG. 5, this figure depicts a flowchart of a process for selecting a network for telecommunication in accordance with an illustrative embodiment. Process 500 may be implemented using network selection application 304 in FIG. 3.

Process 500 begins by receiving a dialed phone number (step 502). A dialed phone number is a called number that a user may dial in order to establish a telecommunication call. Recall that the user includes applications that can initiate a call. The process determines if the dialed phone number is present in a local database, such as local database 316 in FIG. 3 (step 504). If the dialed phone number is not present in the local databases ("No" path of step 504), the process constructs a query including the dialed phone number (step 506). The process sends the query and any optional authenticating information, as described above with respect to FIG. 3, to a database, such as database 320 in FIG. 3 (step 508).

The process receives a response from the database to which it sent the query and optional authenticating information in step 508 (step 510). The process determines whether any indication is present that the user who dialed the phone number wants to override the network identified for that dialed phone number in the response (step 512). The user may want to override the selection of the network associated with the dialed phone number as indicated in the response. For example, if the dialed phone number is a fax number, the user may want to force the call to go over PSTN for better reliability as compared to the same call going over VOIP network. Thus, even if the dialed phone number is indicated to be supported on a VOIP network, the user may want to override that indication and force the call to use PSTN.

As another example, a user may always want to use PSTN for 911 emergency calls, regardless of whether the 911 service is reachable on VOIP network. As another example, an application may want to force a call originating from a softphone to use the VOIP network even if the dialed phone number is supported on PSTN, as the application may want to associate with the call certain other data streams, such as a shared whiteboard or a video stream. As another example, a conference calling phone number may be supported on VOIP network, but a user dialing the conference calling phone number may wish to override the selection of the VOIP network and select PSTN instead if all other callers are also on PSTN. These examples are described only for the clarity of the description and not intended to be limiting on the illustrative embodiments. Many other situations are conceivable in which a user may want to override the selection of the network supporting a called number by selecting a different network.

Returning to step 512, if no indication is present that the user who dialed the phone number wants to override the network identified for that dialed phone number in the response ("No" path of step 512), the process selects the network based on the response received in step 510 (step 514). If, however, an indication is present that the user who dialed the phone number wants to override the network identified for that dialed phone number in the response ("Yes" path of step 512), the process selects the network based on the overriding specification of the network (step 518).

Returning to step 504, the dialed phone number may be present in the local database. If the dialed phone number is present in the local databases ("Yes" path of step 504,) the process selects a network based on the entry for the dialed phone number in the local database (step 520).

Regardless of how the network is selected from among the various selection options described above, the process connects the call using the selected network (step 516). The process ends thereafter.

With reference to FIG. 6, this figure depicts a flowchart of a process of updating the network selection application in accordance with an illustrative embodiment. Process 600 may be implemented using network selection application 304 in FIG. 3.

Process 600 begins by checking for updates (step 602). Note that a network selection application may check for updates, as in step 602, or may receive updates without having to check for the updates. Thus, a particular implementation may have two paths in process 600, one including step 602, and one bypassing step 602, as depicted by the dotted arrow 603 around step 602. For example, an implementation of process 600 may check for updates to the local database, such as local database 316 in FIG. 3, but passively receive updates for any bug fixes that may become available at any time.

Whether by checking or by passively receiving, process 600 receives any updates available for the network selection application (step 604). The process installs the updates received in step 604 (step 606). The process ends thereafter.

With reference to FIG. 7, this figure depicts a flowchart of a process of responding to a request from a network selection application in accordance with an illustrative embodiment. Process 700 may be implemented using database 320 in FIG. 3.

Process 700 begins by receiving a query and any optional authenticating information, such as those sent in step 508 in FIG. 5 (step 702). As described above, a database, such as database 320 in FIG. 3, may or may not perform authentication of the requesting device or user. If authentication is performed, and authenticating information is received in step 702, process 700 determines if the requesting user and/or device have been authenticated (step 704). If the user and/or the device have been authenticated ("Yes" path of step 704), the process searches the database using the phone number supplied in the query (step 706). The process may search a database, such as databases 320 in FIG. 3, using the database's data, such as data 324 in FIG. 3, for performing step 706.

Based on the result of the search performed in step 706, the process constructs a response to the query received in step 702 (step 708). The process then sends the response to the requesting user and/or device that sent the query received in step 702 (step 710). The process ends thereafter.

Returning to step 704, a requesting user and/or device may not be authenticated. If the requesting user and/or device are not authenticated ("No" path of step 704), the process ends.

Note that the steps of processes 500, 600, and 700 are selected and described only for clarity of the description and are not limiting on the illustrative embodiments. Depicted steps may be combined, further divided, augmented to, deleted, or modified in particular implementations.

Furthermore, the various illustrative embodiments are described using called number for selecting a network only for the clarity of the description. Called numbers are used only as exemplary and are not limiting on the illustrative embodiments. Any called identifier, as described above, may be used in place of a called number in the manner described in an implementation of the illustrative embodiments.

Thus, in the illustrative embodiments described above, a computer implemented method, apparatus, and computer program product provide for selecting a network for telecommunication. The illustrative embodiments describe an improved telecommunication system where one of many accessible networks may be selected for connecting a call. In one embodiment, the selection of the network is based on learning the network on which a called number is supported. Selecting at the calling communication device for connecting a call, a network that supports the called number, may avoid using network-based gateways and data processing that is presently required for connecting calls to and from dissimilar networks. Thus, connecting a call using a network that is common to both the calling number and the called number using the illustrative embodiments may be more efficient, cheaper, and easier, than connecting a call that originates on one type of network and terminates on another type of network.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed is:

1. A method for selecting a network for communicating, the method comprising:
   receiving at a first voice over Internet Protocol (VoIP) phone, an identifier for a second VoIP phone, for establishing a communication session between the first VoIP phone and the second VoIP phone;
   identifying, by the first VoIP phone, a plurality of network types associated with the second VoIP phone using the called identifier;
   automatically selecting, by the first VoIP phone, a selected network type from the plurality of network types associated with the second VoIP phone, based on a capability of the first VoIP phone to use the selected network type; and
   establishing the communication session between the first VoIP phone and the second VoIP phone using the selected network.

2. The method of claim 1, wherein identifying, by the first VoIP phone, the plurality of network types associated with the second VoIP phone comprises:
   querying a local database on the first VoIP phone with a query including the called identifier, the local database containing network type information for frequently called identifiers associated with the first VoIP phone; and
   receiving a response to the query; and
   determining whether the response includes the plurality of network types associated with the called identifier.

3. The method of claim 2, further comprising:
   responsive to a determination that the response from the local database does not include the plurality of network types associated with the called identifier, querying a remote database accessible to the first VoIP phone over a data network with a second query that includes the called identifier;
   receiving a second response to the second query from the remote database; and
   determining whether the second response includes the plurality of network types associated with the called identifier.

4. The method of claim 3, wherein the local database includes information about called identifiers that are provided by a user.

5. The method of claim 3, wherein the remote database includes information about authenticating information about a plurality of VoIP phones capable of sending the query.

6. The method of claim 3, further comprising installing updates.

7. The method of claim 1, further comprising:
   presenting a user interface to a user of the first VoIP phone for enabling the user to manually override the selection of the identified network prior to completing the communication session; and
   overriding the identified network with a second identified network selected by the user, and wherein completing the communication session uses the second identified network.

8. The method of claim 1, wherein the called identifier is a called number.

9. The method of claim 1, wherein the selected network type is a data network.

10. The method of claim 9, wherein the data network is an Internet Protocol network.

11. The method of claim 1, wherein the selected network type is a public switched telephone network (PSTN).

12. The method of claim 1, wherein the communication session comprises a videostream.

13. The method of claim 1, wherein at least one of the VoIP phones is a softphone application running on a computer.

14. The method of claim 1, wherein at least one of the VoIP phones is a VoIP adapter connected with a traditional phone.

15. A non-transitory computer usable program product in a computer readable medium storing computer executable instructions for selecting a network for communication that, when executed, cause a first a first voice over Internet Protocol (VoIP) phone to:
   receive an identifier for a second VoIP phone, for establishing a communication session between the first VoIP phone and the second VoIP phone;
   identify a plurality of network types associated with the second VoIP phone using the called identifier;
   automatically select a selected network type from the plurality of network types associated with the second VoIP phone, based on a capability of the first VoIP phone to use the selected network type; and
   establish the communication session between the first VoIP phone and the second VoIP phone using the selected network.

16. The program product of claim 15, wherein the communication session comprises a videostream.

17. The program product of claim 15, wherein at least one of the VoIP phones is a softphone application running on a computer.

18. A voice over Internet Protocol (VoIP) phone that selects a network for communication, the VoIP phone comprising:
- a non-transitory memory storing computer executable instructions and data, wherein the data includes a plurality of network types respectively corresponding to called identifiers;
- a processing component for executing the computer executable instructions to:
  - receive an identifier for a second VoIP phone, for establishing a communication session between the VoIP phone and the second VoIP phone;
  - identify a plurality of network types associated with the second VoIP phone using the called identifier;
  - automatically select a selected network type from the plurality of network types associated with the second VoIP phone, based on a capability of the VoIP phone to use the selected network type; and
  - establish the communication session between the VoIP phone and the second VoIP phone using the selected network.

19. The VoIP phone of claim 18, wherein the communication session comprises a videostream.

20. The VoIP phone of claim 18, wherein at least one of the VoIP phones is a softphone application running on a computer.

* * * * *